J. B. FOOTE.
FRUIT PITTING MACHINE.
APPLICATION FILED MAY 24, 1911.

1,024,625.

Patented Apr. 30, 1912.
5 SHEETS—SHEET 2.

Witnesses:

Inventor:-
John B. Foote
By: Fred Gerlach
his Atty.

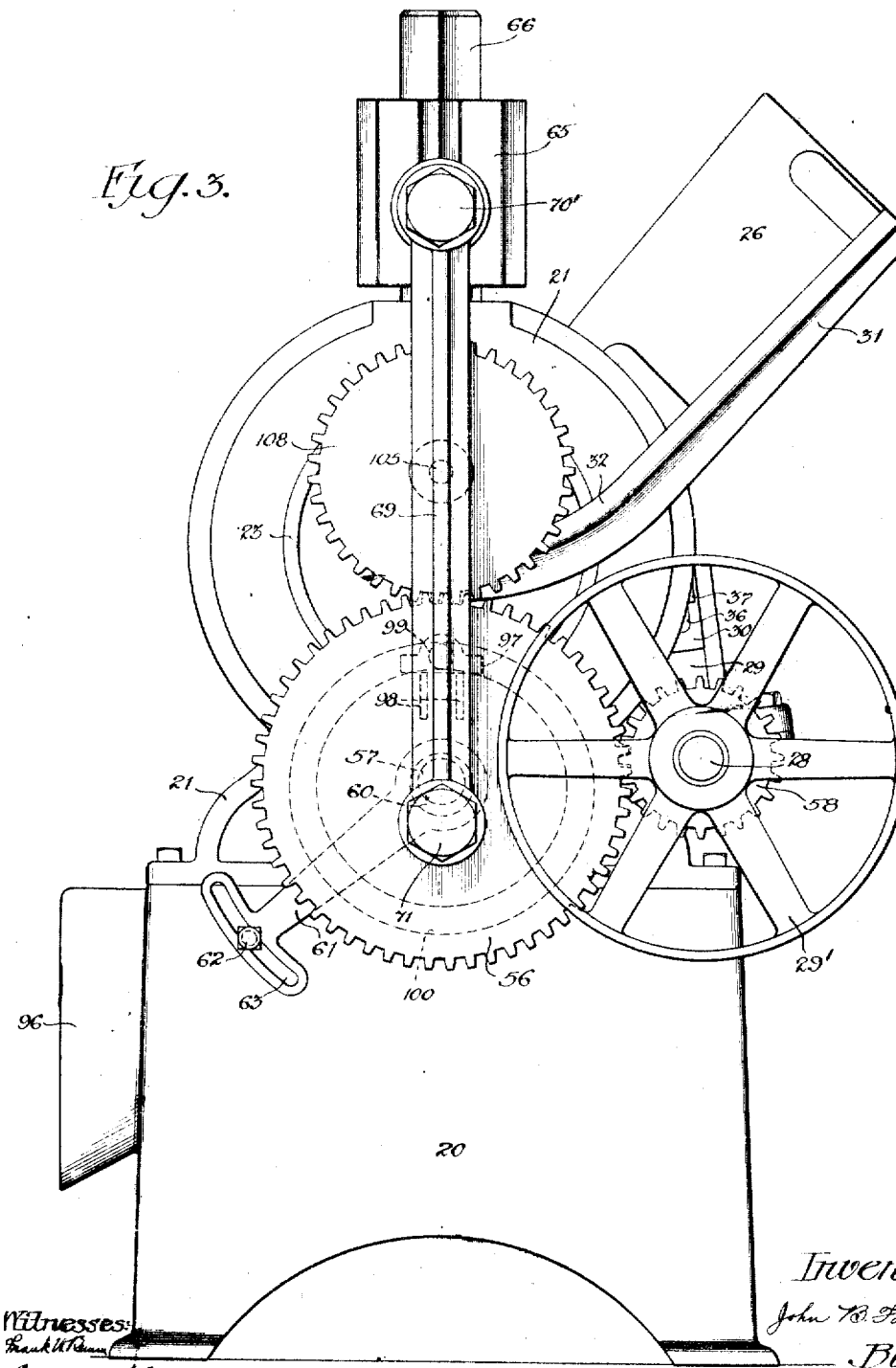

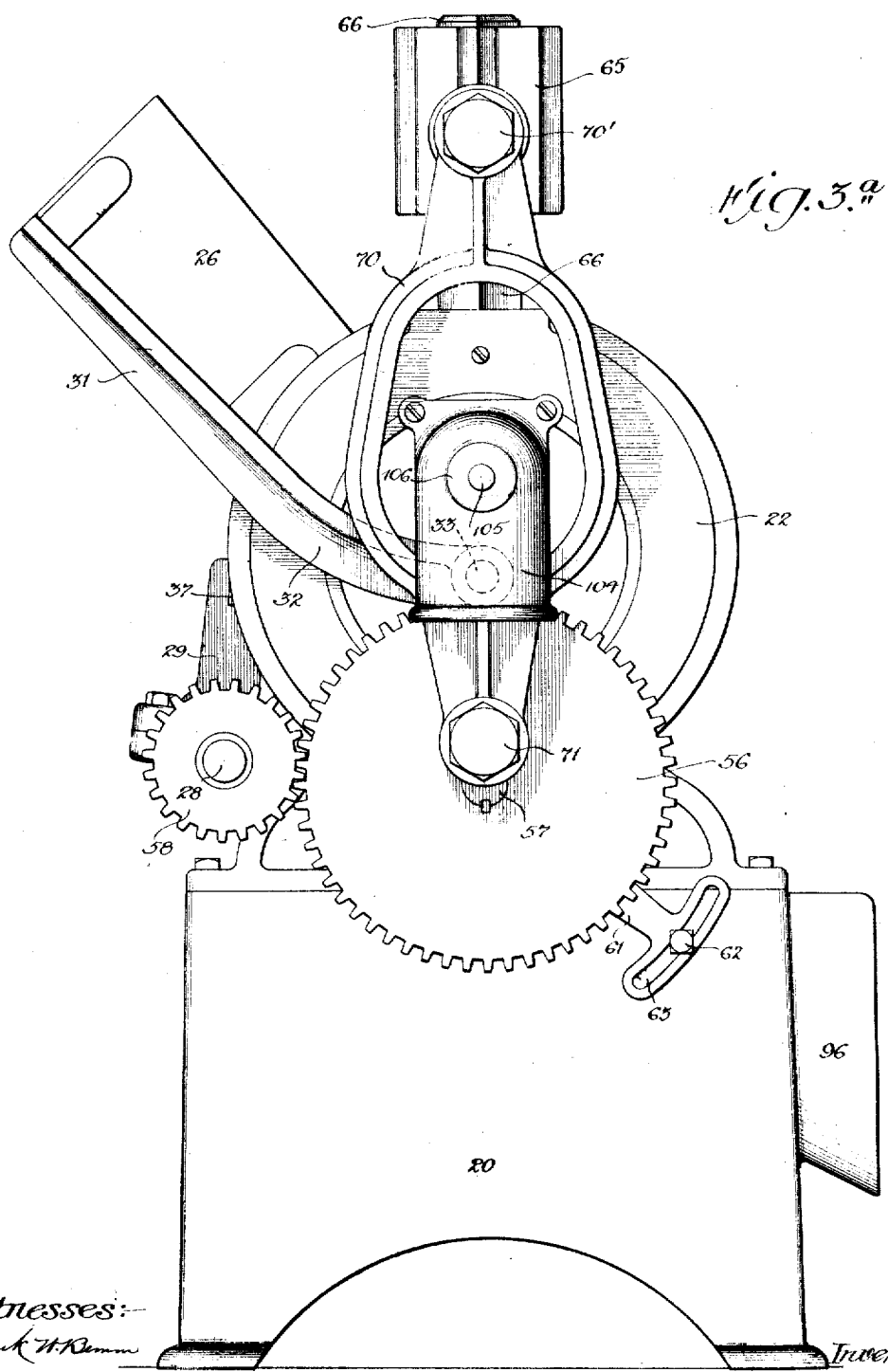

J. B. FOOTE.
FRUIT PITTING MACHINE.
APPLICATION FILED MAY 24, 1911.
1,024,625.
Patented Apr. 30, 1912.
5 SHEETS—SHEET 5.
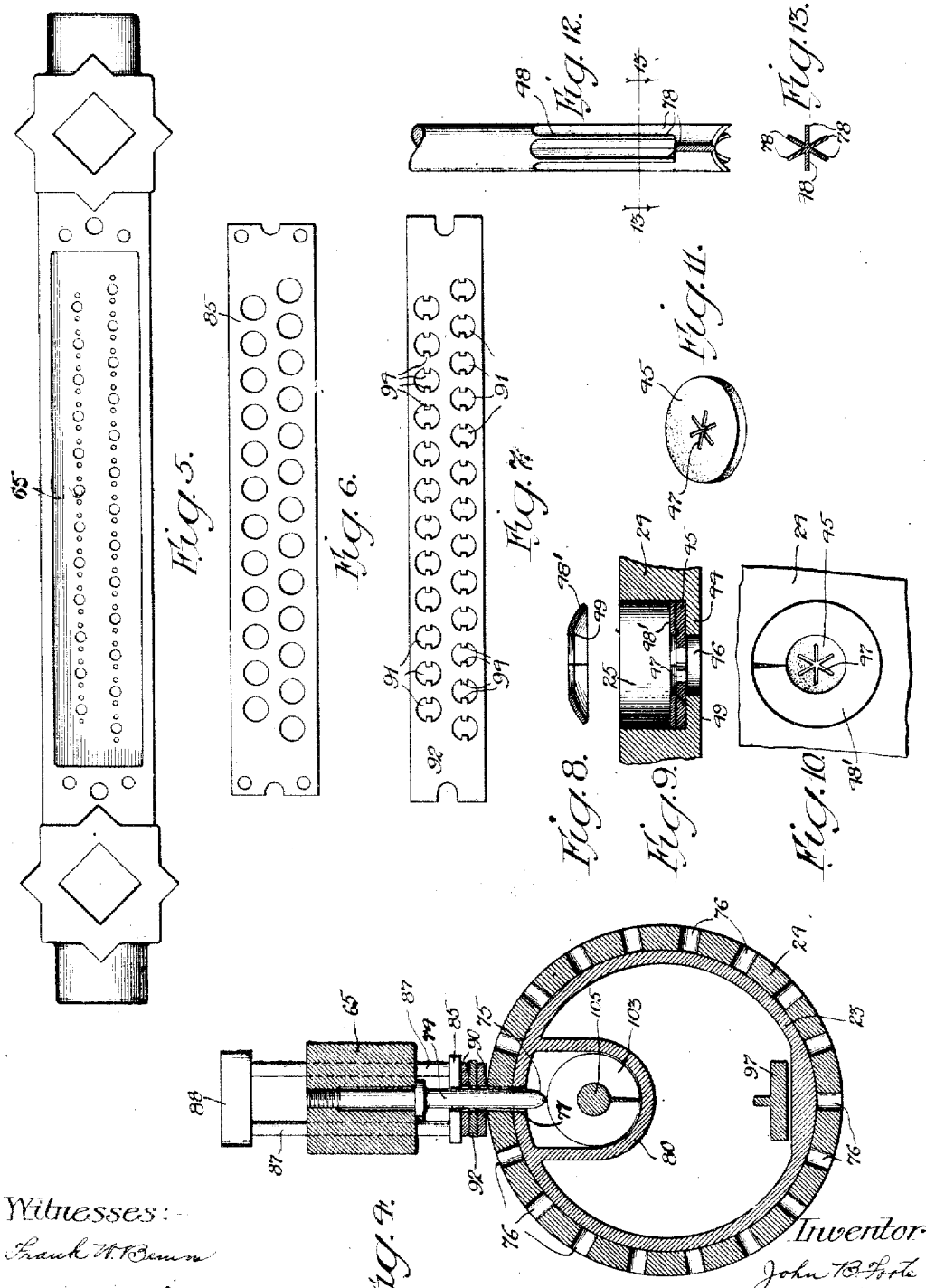

UNITED STATES PATENT OFFICE.

JOHN B. FOOTE, OF OAK PARK, ILLINOIS.

FRUIT-PITTING MACHINE.

1,024,625.  Specification of Letters Patent.  Patented Apr. 30, 1912.

Application filed May 24, 1911. Serial No. 629,172.

*To all whom it may concern:*

Be it known that I, JOHN B. FOOTE, a resident of Oak Park, in the county of Cook and State of Illinois, have invented certain new and useful Improvements in Fruit-Pitting Machines, of which the following is a full, clear, and exact description.

The present invention relates to pitting-machines of the type employed for pitting cherries, and designs more particularly to provide an improved machine, having a large capacity to adapt it for use in canneries.

Another object of the invention is to provide a pitting-machine, having individual dies which can be quickly and conveniently and separately replaced, as the occasion requires. In practice it is customary to employ rubber or elastic dies through which the pits and the knives are driven and which hold the pulp and fruit in the cells. Frequently these elastic dies become defective or worn, and in some instances one die will wear out or become defective before the others, and by providing individual or separate dies and holding-means which permit any defective die to be separately and quickly removed, the latter may be separately changed when necessary.

Another object of the invention is to provide improved means for supplying fruit to the cells in the rotating drum, to insure loading of all of the cells before they pass to the pitting-mechanism, comprising vibrating mechanism which agitates fruit to cause it to be shaken down into the cells of the revoluble drum.

Another feature of the invention consists in providing a centering-device for accurately positioning the drum with respect to the pitting-knives, so that the drum may be quickly and intermittently operated, but none the less so that the dies and cells will be accurately positioned with respect to the pitting-knives during each stoppage of the drum.

Another object of the invention is to provide means for limiting the movement of the individually operated fruit-centering devices so that if the machine is operated without fruit into the drum cells, the centering devices will not cause injury to the dies or be injured by contact with the bottom of the cells.

The invention still further designs to provide a fruit-pitting machine of improved construction, and which is efficient in operation and has a large capacity.

The invention consists in the several novel features hereinafter set forth and more particularly defined by claims at the conclusion hereof.

Figure 1:
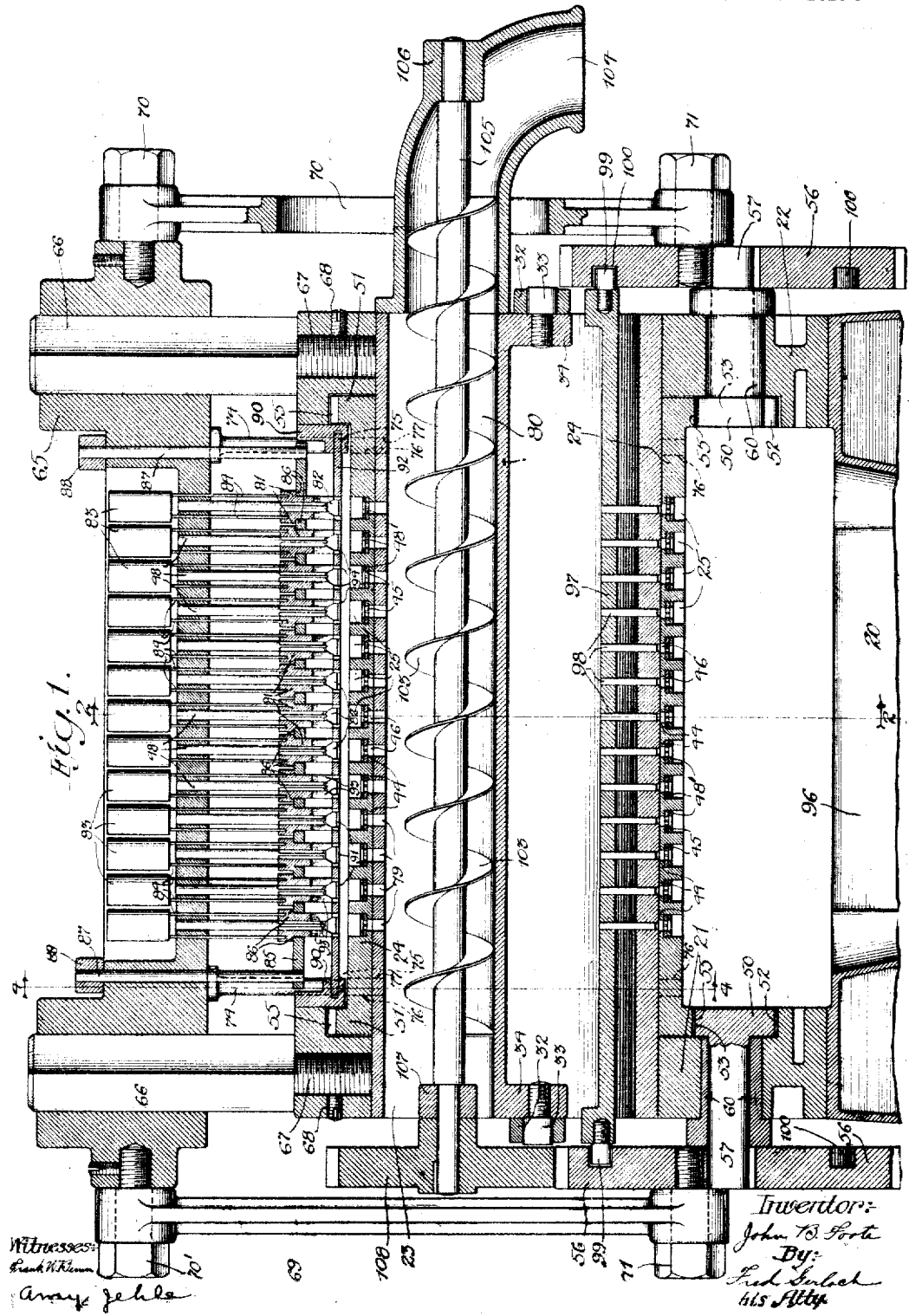
Figure 2:
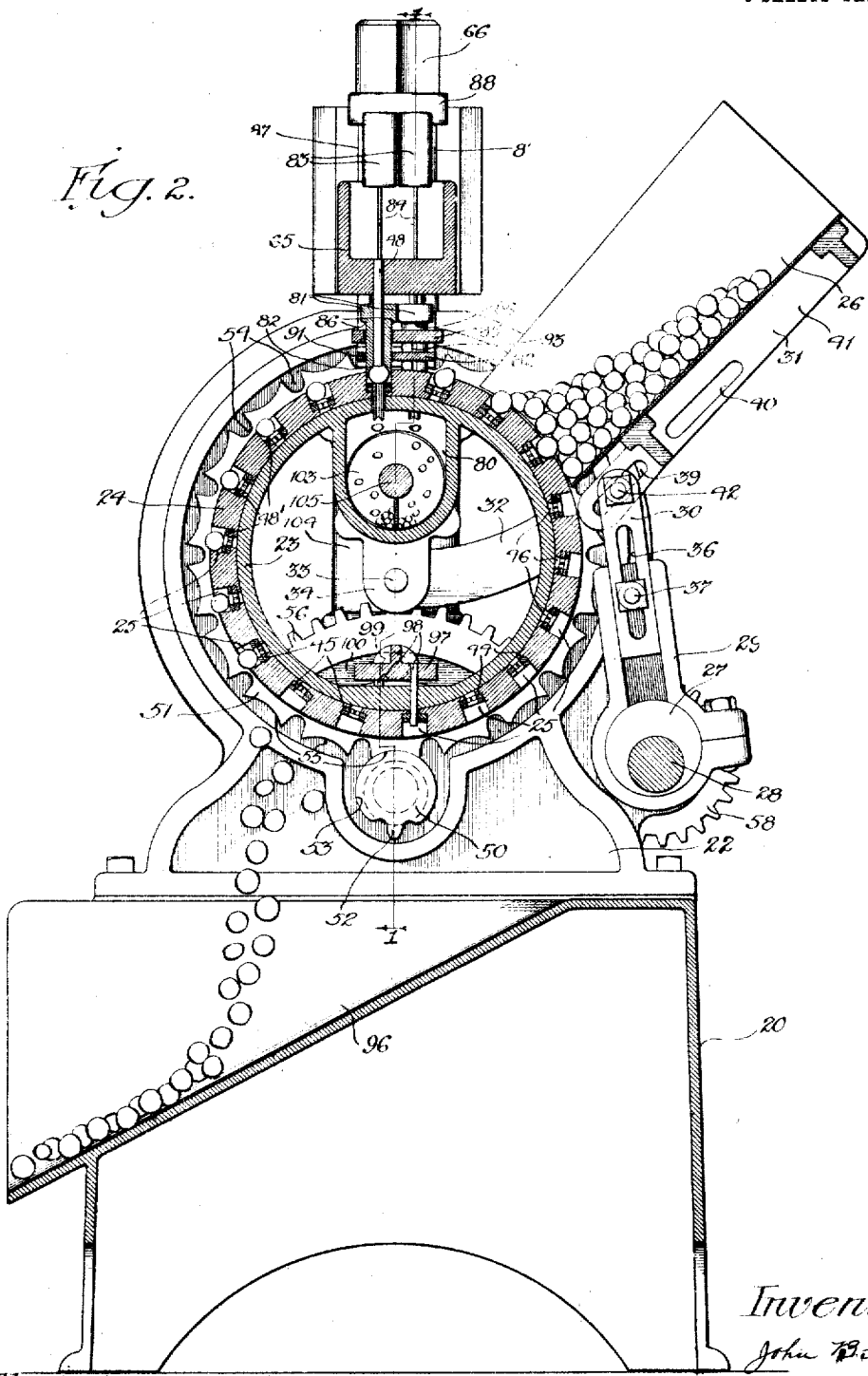

In the drawings Figure 1 is a vertical longitudinal section taken on line 1—1 of Fig. 2. Fig. 2 is a vertical transverse section on line 2—2 of Fig. 1. Fig. 3 is an end elevation. Fig. 4 is a section taken on line 4—4 of Fig. 1. Fig. 5 is a detail plan of the cross-head to which the pitting knives are secured. Fig. 6 is a detail plan of the plate for guiding the fruit-centering devices. Fig. 7 is a detail plan of the stripper-plate. Fig. 8 is a detail section of one of the spring washers for holding an elastic die in the cell. Fig. 9 is a detail section through one of the cells. Fig. 10 is a detail view of the same. Fig. 11 is a perspective of one of the elastic dies. Fig. 12 is a detail elevation of one of the pitter-knives. Fig. 13 is a section on line 13—13 of Fig. 12.

The several mechanisms of the improved pitting-machine are operatively sustained by a suitable supporting structure or frame, which comprises a base 20 and sides 21 and 22 which are rigidly mounted upon the base. A stationary cylindrical shell 23 is secured in and extends between the frame-sides 21 and 22, and a drum 24 having longitudinal series of fruit-cells therein fits around the periphery of shell 23 and is journaled thereon. The alternate series of the cells 25 in the drum are relatively offset or in staggered relation to each other and each cell is adapted to receive and hold one cherry and to carry fruit from a hopper or pan 26 which contains the fruit in bulk to the cells in the drum. This shell effectively incloses the interior of the drum, so that no juice from the fruit will pass to the mechanism in the shell.

In order to insure the loading of substantially all of the cells, as the drum is intermittently rotated or operated step-by-step, mechanism is provided for vibrating the pan to shake the fruit over the periphery of the drum and cause the fruit to pass into the cells. This mechanism comprises an eccentric 27 secured to the main drive-shaft 28 which is driven by means of a belt-pulley 29 and adjustable pitman or connectingrod 29 which is pivotally connected at one of its ends to eccentric 27, and at its other end, to the pan, by an adjustable member 30. Pan 26 is secured to a suitable frame 31 which is secured to arms 32 which have their ends pivotally connected, as at 33, to lugs 34 on the stationary shell 23. Pivots 33 are concentric with the axis of the drum 24 so that the pan 26 will be vibrated around the drum but not away from the same. An adjustable connection consisting of a slot 36 in pitman member 30, and a bolt 37 extending through said slot and through the pitman 38, is provided to cause the sweep or range of the fruit-pan to be raised or lowered, so that the pan will be operated at different inclinations, according to the condition of the fruit being fed to the drum. When the fruit is wet or sticky, greater inclination or vibration is necessary to cause it to roll into the cells, than when the fruit is comparatively dry. The extent of vibration or vibratory stroke of the pan may also be varied by means of slots 39 and 40 formed in a central rib 41 on frame 31. By extending bolt 42 through slot 40 in frame 31 which is farther from the axis about which the pan swings, the throw of the pan may be decreased. These adjustable connections thus provide means for varying the range of movement and the inclination of the pan to adapt the mechanism for the particular fruit to be operated on, so as to insure the loading of substantially all of the cells of the drum, notwithstanding variation in the condition of the fruit.

In practice it has been found that an elastic washer or die is most efficient in pitting because it will yield to permit the pits to be driven therethrough by the knife, and will also prevent the pulp from being removed with the pits. These elastic dies, however, sometimes become defective from wear, whereupon replacement is necessary to keep up the efficiency of the machine. Furthermore, in many cases some of these elastic dies will remain operative longer than others and the present invention makes provision for individual or separate removal and replacement of any of these dies in the drum, so that it is only necessary to replace the particular die which may become defective. This feature is peculiarly of importance and advantage in machines in which a drum having a large number of cells is employed. Each cell 25 in the drum is provided with a ledge or bottom 44 which forms a seat or rest for an elastic washer or die 45 an opening 46 being formed in the bottom 44, corresponding to the diameter of the knife to permit the pits and the knife to pass therethrough. The elastic die is formed with a series of radial slits 47 for a correspondingly shaped pitting-knife 48, the tongues between the slits permitting the pit to be forced through the die by the knife. Each elastic die 45 is removably held in the bottom of the cell by a spring washer 48' which is normally concave, is split so it will readily enter the cell, and is provided with a thickened or inturned edge 49 to stiffen the inner edge of the washer to firmly hold the elastic die in place. The washer is usually formed of flexible metal, such as brass, and when it is placed in the cell it is expanded by a suitable tool, such as a punch, which will flatten it and cause its outer edge to be firmly pressed against the wall of the cell, to cause the washer and die to be firmly held therein, so that the operation of the knives will not loosen or displace the die or washer. When replacement of any die 45 is desired, it is only necessary to take a suitable tool and pry out one end of the washer and then the washer may be sprung away from the wall of the cell.

The opening in each washer 48' through which the knives pass, is larger than the knives, and by reason of this and the rounded inner edge of the washer, the washer does not act as a die, but merely as a support and the knives remove only the pits, while the elastic dies retard the pulp. This feature is an important one, because in prior constructions, in which the hole in the retaining element above the elastic die was approximately just large enough to permit passage of the knife therethrough, said element would act as a die, and the entire central portion of a cherry would be removed and driven through the elastic die. Intermittent or step-by-step movement is imparted to the drum to cause the helical series of cells to be successively brought into position beneath the pitter-knives, by gear mechanism comprising a pinion 50 and a gear 51, at each end of the drum. Each pinion is provided with a tooth 52 and a concentric locking surface 53, this tooth being adapted to enter notches 54 in gear 51 while the locking surface 53 is adapted to fit into corresponding recesses 55 on gear 51. Pinions 50 are continuously driven by gear wheels 56 secured respectively to the pinion-shafts 57, and which mesh with pinions 58 on the drive-shaft 28. Continuous movement imparted to gears 56 by pinions 58 will thus intermittently rotate or advance the drum, and between the advancing movements, surfaces 53 and 55 will lock the drum so that the cells will be in registry with the pitter-knives. It is desirable that the movements of the drum be as accurate as possible, and in practice these locking gears become worn, and to compensate for wear the shafts 57 are each journaled in an eccentric bearing 60 which is mounted in one of the frame sides and is provided with an arm 61, whereby the bearing may be adjusted to bring the shaft into closer relation to the gear 51 on the drum. A bolt 62 and a slot 63 in arm 61 serve as means for securing the eccentric bearing in its adjusted position.

A cross-head 65 carries the pitter-knives 48 and is mounted to slide vertically on square posts 66 which have their lower ends screw-threaded into the frame sides 21 and 22 respectively. Screws 68 serve to lock the posts against rotation. This cross-head 65 is reciprocated to operate the pitter knives through the fruit in the cells of the drum by pitmen 69 and 70, each of which has its upper end pivotally connected to the cross-head by a pivot-bolt 70' and its lower end connected to a wrist-pin 71 on the gears 56 respectively. To further insure accurate positioning and stoppage of the drum so that the cells and dies therein will be accurately positioned to receive the pitter-knives and the fruit-centering devices, the cross-head 65 is provided with pins 74 each of which has a lowered tapered terminal 75 which is adapted to successively enter holes 76 in the drum and to pass through a hole 77 in the stationary shell 23, in advance of the pitter-knives, so that in the operation of the machine at high speed, the accurate positioning of the cells relatively to the pitter-knives and the centering-devices for the fruit, will be insured.

In practice heretofore, it has been customary to form the pitter-knives with four ribs or blades, but it has been found that occasionally a pit would not be caught by the end of the knife and would pass into the space between the blades. To overcome this difficulty each knife is formed with six radial ribs or blades 78 and the openings or slits 47 in the elastic die are similarly shaped. By providing this number of blades on each knife, even small pits will be caught by the knife and removed from the fruit, and the tongues between the slits 47 in the elastic die 45 are still of sufficient width and resiliency to cause them to hug the knife.

The knives 48 are disposed in two longitudinally extending series, one off set or staggered with respect to the other, so that the knives may be placed in close proximity to each other, and the cells in the drums are correspondingly arranged, the axis of each cell being slightly tangential so that the knives may be operated together and in parallel position to each other. The knives are reciprocated through the washers 48', elastic dies 45 and openings 46 in the drum and through holes 79 in the stationary shell 23, to force the pits from the fruit in the cells, into a conveyer tube 90 in the shell.

A device for centering the fruit in each cell consists of a hollow sleeve 81, the lower portion of which is adapted to enter the cells in the drum and has a flared recess or mouth 82, which will cause fruit of different sizes to be centered in the cell. The pitter-knives operate through these centering-sleeves and each of the latter is caused to rest on the fruit with a non-varying pressure, by a weight 83 which is connected to the sleeve 81 by rods 84 which pass through and are guided in cross-head 65 and have their lower ends secured in the sleeve. These sleeves 81 are slidably mounted in a plate 85 and are provided with shoulders 86 above said plate to cause the plates to positively raise the sleeves away from the fruit. The plate 85 which supports and raises the centering sleeves is operated by rods 87 which are slidably held in and extend through cross-head 65 and are provided with abutments 88 at their upper ends which limit the movement of plate 85 relatively to the cross-head, in one direction. When the cross-head 65 is lowered, the pitter-knives, centering-sleeves and plate 85 will move in unison until the sleeves are arrested by the fruit in the cells and the weights 83 will then become active to cause the flared mouths of the sleeves to center the fruit in the cells. Plate 85 will be arrested by stops 90 to prevent excessive movement of the centering-sleeves which might cause the lower ends of these sleeves to strike washers 48 in the cells and injure the elastic dies by pounding if there should be no fruit in one of the cells. The sliding connection between rods 87 and the cross-head permits the plate 89 to be arrested for this purpose. When fruit is present in the cells, sleeves 81 will be arrested before plate 85 is arrested by stops 90, and the sleeves will be raised in plate 85 so they will be free to press against the fruit. This mechanism avoids contact between the thin lower edge of the sleeves 81 and the washers 48, which would wear or roughen said edge. The sliding connection between plate 85 and the cross-head makes it possible to employ short sleeves. After each pitting operation the cross-head will be raised, withdrawing the knives from the fruit and will engage stops 88 to positively lift rods 87 and plate 85 which will also positively lift the centering sleeves. This lost-motion connection between plate 85 and the cross-head makes it possible to employ short centering-sleeves, and the stops for the plate prevent excessive movement of any sleeve which might enter an unloaded cell.

The centering-sleeves operate through holes 91 in a stationary stripper plate 92. Each centering sleeve is provided with slots 93 into which extend ribs 94 on the stripper plates. Resultantly, as the centering-sleeves are withdrawn from the cells in the drum, the fruit is prevented from adhering to the flared mouth of each centering-sleeve and is caused to remain in the cells. The pitted fruit remaining in the cells of the drum is carried around with the drum and discharged into a chute 96 formed in base 20.

It sometimes occurs that the pitted fruit will adhere to the cells, so an ejector-plate 97 having plungers 98 secured thereto is operated by studs 99 which extend into cam-grooves 100 in gears 56 respectively. Approximately one-half of each of these cam-grooves is concentric so that the plungers 98 will remain stationary in the rotative steps of the drum. These plungers 98 are guided in stationary shell 23 and are adapted to extend through holes 46, elastic dies 45 and spring-washers 48' to forcibly eject the pitted fruit from the cells and discharge it from the drum and cause it to fall into duct 96.

A screw conveyer 103 is mounted in conveyer-tube 80 to discharge the pits through a spout 104 which is secured to the stationary shell 23 or frame side 22. The shaft 105 of this conveyer is journaled in a bearing 106 in spout 104 and a bearing 107 at the opposite end of tube 80 and a gear-wheel 108 secured to said shaft and meshing with one of the gears 56 serves to continuously drive the conveyer.

The operation of the improved machine will be as follows: Fruit in bulk will be dumped into the pan 26 and shaft 28 will be continuously driven. Eccentric 27 on said shaft, by means of pitmen 29, will vibrate the pan and fruit therein to cause it to be distributed into all of the cells of the drum as they are successively brought into position adjacent the pan. The pan is pivoted to swing about the axis of the drum, and by adjustment of member 30 the inclination of the pan may be varied to cause the fruit to flow more or less readily according to the condition of the fruit. The stroke of the pan may also be varied by adjusting the connection between pitmen and slots in frame 31 to which the pan is secured, this adjustment being sometimes desirable for the same purpose. Step-by-step rotary movement will be imparted to the drum to successively bring two series of loaded cells into position beneath the pitter-knives by gears 58, 56, shafts 57, pinions 50 and gears 51 on the drum. During the operation of the pitter knives, the drum will be locked in position by the interlocking surfaces of pinion 50 and gear 51. During each stoppage of the drum cross-head 65 will be operated by pitmen 69 and 70. Initially the cross-head, sleeves 81, plate 85, and the pitter-knives will be lowered in unison until the sleeves engage the fruit in the cells respectively. The weights 83 will exert sufficient pressure upon the sleeves to cause them to center the fruit in the cell. Plate 85 will be arrested by stops 90 to prevent any sleeve which might enter an unloaded cell from striking the washer 48'. After the sleeves have centered the fruit in the cells, the pitter-knives will be driven through the fruit to remove the pits and drive them through the elastic dies and openings 79 in shell 23, and into duct 80 from which they will be removed by a screw conveyer 103 and then discharged through spout 104. During the up-stroke of cross-head 65, the knives will be withdrawn from the fruit, and then the sleeves will be operated upwardly by plate 85 and the lugs 94 on plate 92 will prevent the pitted fruit from adhering to the sleeves and knives. The pitted fruit will remain in the cells until discharged by gravity, into the chute 96 as illustrated in Fig. 2. Any fruit which should adhere to the cells will be discharged therefrom by plungers 98.

The invention is not to be understood as restricted to the details set forth, since these may be modified by the skilled mechanic within the scope of the appended claims without departing from the spirit and scope of the invention.

Having thus described the invention, what I claim as new and desire to secure by Letters Patent is:

1. In a pitting machine, the combination of an element having cells therein, a series of pitter-knives mounted to operate through the fruit in the cells, separate elastic dies in the cells, separate washers for holding said dies in the cells each having its inner edge bent to press into its die, mechanism for rotating the element, and mechanism for operating the knives.

2. In a pitting-machine, the combination of an element having a cell therein, a pitter-knife, an elastic die through which the knife operates, a removable superposed spring washer in said cell for holding the die in operative position, and means for operating the knife through the die.

3. In a pitting-machine, the combination of an element having a cell therein, a pitter-knife, an elastic die through which the knife operates, a removable superposed split spring washer in said cell for holding the die in operative position, and means for operating the knife through the die.

4. In a pitting-machine, the combination of an element having a series of cells therein, a separate elastic die for each cell, removable spring washers in the element for holding the elastic dies means in the element for separately supporting the dies, pitter-knives, mechanism for rotating the element, and mechanism for operating said knives through the cells.

5. In a pitting-machine, the combination of a drum having cells therein, a fruit pan pivotally sustained to swing substantially about the axis about which the drum rotates, mechanism for vibrating said pan, and mechanism for operating the drum.

6. In a pitting-machine, the combination of a drum having cells therein, a fruit pan pivotally sustained to swing substantially about the axis about which the drum rotates, mechanism for vibrating said pan, means for varying the extent of vibration of the hopper, and mechanism for operating the drum.

7. In a pitting-machine, the combination of means provided with a cell, an abutment for the fruit in the cell, a flared sleeve for centering the fruit on the abutment, a pitter-knife, means for causing the pitter-knife to remove the pits from the fruit held between said sleeve and said abutment, means for bringing the sleeve and abutment together, and means for arresting the movement of the sleeve toward the abutment before the sleeve reaches the abutment.

8. In a pitting-machine, the combination of a drum having cells therein, abutments for the fruit in the cells, flared-sleeves for centering the fruit on the abutments, pitter-knives, means for operating the sleeves, and means for arresting the sleeves before the sleeves reach the abutments.

9. In a pitting-machine, the combination of an element provided with cells for the fruit, means for holding the fruit in the cells, flared-sleeves for engaging the fruit in the cells, pitter-knives, a head to which the pitter-knives are secured, means operated by said head for operating the sleeves and to which the sleeves are independently and slidably connected, a slidable connection between said means and said head, and mechanism for operating said head.

10. In a pitting-machine, the combination of a drum provided with cells for the fruit, means for holding the fruit in the cells, pitter-knives, a head to which the pitter-knives are secured, means operated by said head for operating the sleeves and to which the sleeves are slidably connected, a slidable connection between said means and said head, stop-means for the sleeve-operating means, mechanism for operating said head, and mechanism for operating the drum.

11. In a pitting-machine, the combination of a drum provided with cells for the fruit, means for holding the fruit in the cells, flared sleeves for engaging the fruit in the cells, pitter-knives, a head to which the pitter-knives are secured, means for operating the sleeves operated by said head and to which the sleeves are slidably connected, means for arresting the sleeve-operating means, to arrest the sleeves when there is no fruit in the cells, and mechanism for operating the knives and the drum.

12. In a pitting-machine, the combination of a drum provided with cells, dies in the cells, pitter-knives, a head to which said pitting-knives are operatively connected, flared sleeves for engaging the fruit in the cells, a plate to which said sleeves are slidably connected, a lost motion connection between the head and the said plate, stop-means for arresting the movement of the plate to hold the sleeves away from the bottom of the cells when there is no fruit in the cells, mechanism for rotating the drum, and mechanism for operating said head.

13. In a pitting-machine, the combination of a frame, a cylindrical shell secured in said frame, a hollow drum having cells therein mounted to rotate around said shell, mechanism for rotating the drum, pitter-knives, and mechanism for operating said knives through said cells and shell.

14. In a pitting-machine, the combination of a frame, a cylindrical shell secured in said frame, a hollow drum having cells therein journaled on and fitting snugly around said shell, said shell having holes therein through which the pits are forced into the shell, mechanism for rotating the drum, pitter-knives, and mechanism for operating said knives through said cells and shell.

15. In a pitting-machine, the combination of a frame, a cylindrical shell secured in said frame, a hollow drum having cells therein, and journaled on and rotating around said shell, said shell having holes therein through which the pits are forced into the shell, mechanism for rotating the drum, elastic dies in said cells, pitter-knives, mechanism for operating said knives through said cells and dies, a screw-conveyer in said shell for removing the pits, and mechanism for operating said conveyer.

16. In a pitting-machine, the combination of a frame, a shell secured to said frame, a drum mounted to rotate around said shell and having cells therein, mechanism for rotating said drum, said shell having openings therein through which the pits are forced, a bar extending through said shell, ejecting plungers carried by said bar and guided in said shell, and mechanism for operating said bar and plungers comprising cams disposed at the sides of the frame.

JOHN B. FOOTE.

Witnesses:
FRANK W. BRUM,
AMY JELLE.